United States Patent [19]
Arnold et al.

[11] Patent Number: 5,822,301
[45] Date of Patent: Oct. 13, 1998

[54] COMMUNICATION ARRANGEMENT AND METHOD FOR THE EVALUATION OF AT LEAST TOW MULTI-PART COMMUNICATION CONNECTIONS BETWEEN TWO PARTIES TO A COMMUNICATION IN A MULTI-NODE NETWORK

[75] Inventors: Wolfgang Arnold, Ekrath; Johannes Hellendoorn; Rudolf Seising, both of Munich; Christoph Thomas, Taufkirchen, all of Germany

[73] Assignee: Siemens Aktiengesellschaft, Munich, Germany

[21] Appl. No.: 689,231

[22] Filed: Aug. 5, 1996

[30] Foreign Application Priority Data

Aug. 3, 1995 [DE] Germany ................... 195 28 563.8

[51] Int. Cl.⁶ .................................................. H04J 3/14
[52] U.S. Cl. ........................................ 370/238; 370/252
[58] Field of Search ............................ 370/252–253, 370/400, 230, 232, 233, 231, 235, 238, 254, 255; 340/827

[56] References Cited

U.S. PATENT DOCUMENTS

| | | | |
|---|---|---|---|
| 5,163,042 | 11/1992 | Ochiai | 370/17 |
| 5,233,604 | 8/1993 | Ahmadi et al. | 370/255 |
| 5,317,566 | 5/1994 | Joshi | 370/400 |
| 5,509,000 | 4/1996 | Oberlander | 370/409 |
| 5,604,868 | 2/1997 | Komine et al. | 370/400 |

FOREIGN PATENT DOCUMENTS

| | | |
|---|---|---|
| 0372270 A2 | 6/1990 | European Pat. Off. . |
| 0374459 A2 | 9/1995 | European Pat. Off. . |
| 43 08 512 A1 | 9/1994 | Germany . |
| WO 92/16066 | 9/1992 | WIPO . |
| WO 94/28683 | 12/1994 | WIPO . |

OTHER PUBLICATIONS

Segall, Adrian: Failsafe Distributed Algorithms for Routing in Communication Networks; Proceedings of the International Symposium of Flow Control in Computer Networks, France, Feb. 12–14, 1979, pp. 235–340.

*Primary Examiner*—Chi H. Pham
*Assistant Examiner*—Ricky Q. Ngo
*Attorney, Agent, or Firm*—Hill & Simpson

[57] ABSTRACT

The method and arrangement evaluates communication connections in multi-node networks. Two possible lines are thereby evaluated with fuzzy logic with respect to their performance, their time behavior and their dependability aspects. The intermediate variables derive therefrom which are processed with a principal rule set to form a weighting factor for the respective line. A routing method that is to define the shortest path for a communication connection employs this weighting factor in order to determine the corresponding connection. The method and arrangement especially beneficially realized in a multi-node network.

15 Claims, 3 Drawing Sheets

COMMUNICATION ARRANGEMENT AND METHOD FOR THE EVALUATION OF AT LEAST TOW MULTI-PART COMMUNICATION CONNECTIONS BETWEEN TWO PARTIES TO A COMMUNICATION IN A MULTI-NODE NETWORK

BACKGROUND OF THE INVENTION

The expansion of available communication networks is rapidly progressing world-wide. As an example, let the Internet be cited. In such communication networks, parties to the communication can be connected on various communication paths via different relay stations. Such communication networks are highly complex systems that, for example, contain several thousand components. Great significance is therefore accorded the routing function of the network which selects each connection from one component to the other component in the network via which a message is to be transported. In the ISO-OSI reference model for communication networks, the selection of the best communication connection between a transmitting node and a destination node is one of the principal functions of the third layer. The problem of finding the best possible connection for a communication participant arises in every network that does not allow a transmitter to connect directly to a receiver with a single transmission connection but where, instead, a plurality of intermediate communication paths must be bridged. The routing problem in networks therefore represents an archetypical, combinatorial optimization problem for such multi-node networks.

Routing is frequently mentioned when setting up a communication connection via a plurality of relay stations when different communication paths are thereby possible between two parties to a communication. The shortest possible paths between two partners are desired so that the network is not unnecessarily loaded. Such routing strategies of the shortest path are based, for example, on information about the network topology. According, for example, to a dimensional number, the network under consideration viewed in terms of graph theory, a length or a weight is allocated for every connection in the network. The communication path from a given source node to every other node of the network can then be calculated with an algorithm that finds the shortest path.

In order to be able to accomplish the exchange of data packets with such a method, a path or a set of paths between a receiver and a transmitter must be defined in a network before the transmission, the routing algorithm selecting from this path or set of paths. For example, routing tables are stored in every communication node, these indicating the correct output to an intermediate communication link for an arriving communication packet.

There are various routing strategies for producing correct routing tables in the individual communication nodes along a communication path. One of the simplest strategies of finding a path is by specifying a fixed routing. The communication connection is thereby inflexible and the communication connection is always maintained over the same intermediate communication links.

Another strategy is broadcasting each data packet to all other network nodes. This procedure can be necessary, for example, in case topological modifications occur in the network. Such topological modifications can, for example, be errors or modifications and the broadcast in this case serves the purpose of notifying all parties to a communication of the modifications. One version of the broadcasting is represented by flooding the network. The source node thereby sends data packets to all its neighboring nodes and these in turn send data packets to their further, neighboring nodes except to that which sent the message to them.

Adaptive routing represents the opposite of fixed routing. This means that the network or, respectively, the communication connection can flexibly react to dynamic modifications in the network that relate to the topology or to the load of the network. A local routing strategy thereby uses locally accessible information such as, for example, the lengths of the queues of all outgoing connections. Methods that utilize these strategies are also called isolated routing algorithms. Distributed routing strategies that represent mixtures of global and local routing strategies are also known. Of the known methods, however, all require information about the network topology, the load on the network and costs of the communication connections. When, for example, a centralized routing is utilized, the status of each and every individual communication node in the network is monitored by a routing control central such as, for example, a list of neighbors, currents lengths of queues, momentarily existing topology, the traffic data for the individual line connections since the last report, etc. This central routing control center can produce new routing tables and distribute them to all further stations. Multi-path routing represents a further possibility for routing strategies. When more than one optimum communication path is thereby possible, then the communication load can be distributed over the possible paths. For example, it is also possible to weight the possible paths with probabilities for the occurrence of different loads. The delay when distributing data packets through the network, for example, is minimized by the multi-path routing. The criteria in order to find the optimum path through the network are also referred to as routing metrics.

Distributed adaptive routing represents a further possibility. Each node in the network must, for example, implement the following activities: collecting and measuring information about the network topology because there are numerous criteria that can influence the routing decision dependent on the network; the exchange of the collected information with other communication nodes, which is usually accomplished by flooding the network; and calculating the shortest path to all other nodes based on the topology information, which represents a well-solved, known problem.

What all known routing strategies, that identify the shortest path, have in common, however, is that they employ only one network parameter in order to generate the routing information. Different routing methods thereby employ different parameters such as, for example, the transmission delay, the number of relay stations, etc. The routing decision, however, is made exclusively on the basis of this parameter, so that the network communication is optimized only on the basis of this single parameter such as, for example, the delay time; further important criteria for a network operator such as, for example, the connection costs are not taken into account.

SUMMARY OF THE INVENTION

It is an object of the present invention to provide an improved communication arrangement and an improved method for evaluating at least two multi-part communication connections between two parties to a communication in a multi-node network.

In general terms the present invention is a method for the evaluation of at least two multi-part communication connections in a multi-node network. At least two evaluation categories are determined for evaluating a communication connection. At least respectively one measured value that describes the connection with respect to the respective evaluation category is acquired for each determined evaluation category for a respective communication connection. An evaluation criterion is determined for the respective communication connection in that the appertaining measured values are evaluated in the form of satisfaction degrees with respect to the satisfaction of the respective evaluation category and all satisfaction degrees are operated with one another such that the communication connection that has higher satisfaction degrees with respect to the evaluation categories receives an optimum evaluation criterion Advantageous developments of the method of the present invention are as follows.

At least performance of the respective communication connection and/or time behavior of the respective communication connection and/or dependability of the respective communication connection is respectively determined as evaluation category.

Measured values to be acquired are at least respectively determined for: Performance (transmission capacity, transmission costs, transmission time); Time Behavior (delay time between two nodes, time change of the delay time between two nodes); and Dependability (connection dependability, node dependability, packet dependability.

The measured values are processed with fuzzy logic, in that they are treated like linguistic variables whose satisfaction degrees are identified using affiliation functions, in that at least one fuzzy rule set is employed for each of the evaluation categories. The evaluation criterion for the respective communication connection is formed with two-time application of fuzzy logic, in that the satisfaction degrees for the individual evaluation categories are processed with fuzzy logic, whereby they are handled as linguistic variables that are evaluated using at least one principal fuzzy rule set. In a further embodiment at least respective rule sets that operate the following variables with one another are employed: costs of the communication connection with its transmission capacity; transmission time with the costs of the communication connection; delay time between two nodes with the time change of the delay time between two nodes; and connection dependability of the communication connection with its packet dependability.

In another embodiment at least respective rule sets that operate the following variables with one another are employed as principal fuzzy rule set: time behavior of the communication connection with its dependability; time behavior of the communication connection with its performance; and performance of the communication connection with its dependability.

Potential communication connections are evaluated and potential communication connection is selected for the set up of a real connection which receives the optimum evaluation criterion.

The present invention is also a communication arrangement for the implementation of the above-described method, whereby the communication nodes and communication sub-links between the communication nodes are arranged such that two parties to a communication are connectable to one another via at least two communication connections. In a further embodiment of this communication arrangement, the method is implemented at each communication node.

A particular advantage of the inventive method is that a plurality of metric parameters that describe different aspects of the communication connection can be utilized in the evaluation of the connection for the first time. The evaluation categories of time behavior, dependability and capacity of the communication connection are especially advantageously selected given employment of the inventive method since a comprehensive description and evaluation of the respective connection thus becomes possible.

A plurality of measured quantities are beneficially acquired in the determination of the measured parameters, that is, the routing metrics for the individual evaluation categories since a reliable statement about the respective condition of the network can thus be made. It also thus becomes possible to weight the individual measured quantities and balance them relative to one another.

The inventive method is especially advantageously implemented by the employment of fuzzy logic because this is noted therefor that it allows the employment and the evaluation of a plurality of equivalent measured quantities in an especially simple way. A single fuzzy rule set is thereby advantageously evaluated for each individual weighting category.

A plurality of measured quantities that were evaluated in a first step with a single fuzzy rule set are again especially advantageously presented as a linguistic variable by the inventive method, whereby a linguistic variable can thus be found for every individual weighting category that, following thereon, then contributes to a weighting for the respective communication connection to be evaluated with a further fuzzy rule set, the main rule set.

In order to be able to accomplish an evaluation of the connection that is close to practice, fuzzy rule sets are advantageously formed for costs and transmission capacity, transmission time and costs, delay time and variation of the delay time, as well as for the call dependability and the packet security. Beneficially, fuzzy rules are evaluated for the main rule set with the inventive method in a second evaluation stage that links the time behavior of the communication connection to the dependability, the time behavior of the communication connection to the capacity, and the capacity of the communication connection to the dependability of the connection. An evaluation of the respective connection that is close to practice is assured by applying these linkages.

Beneficially, the inventive method is utilized for evaluating potentially possible communication connections and that which receives the most beneficial evaluation criterion, that is, the weight, is selected. It is assured in this way that an optimum use is achieved for a communication user. The inventive method is beneficially utilized in a communication arrangement that allows ring-shaped connections of two parties to a communication via a plurality of relay stations, since the network load and the costs for the parties to the communication can thus be minimized.

The inventive method is beneficially implemented at each node of a communication network, since a redundancy is thus assured and the correct network data are always currently available.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
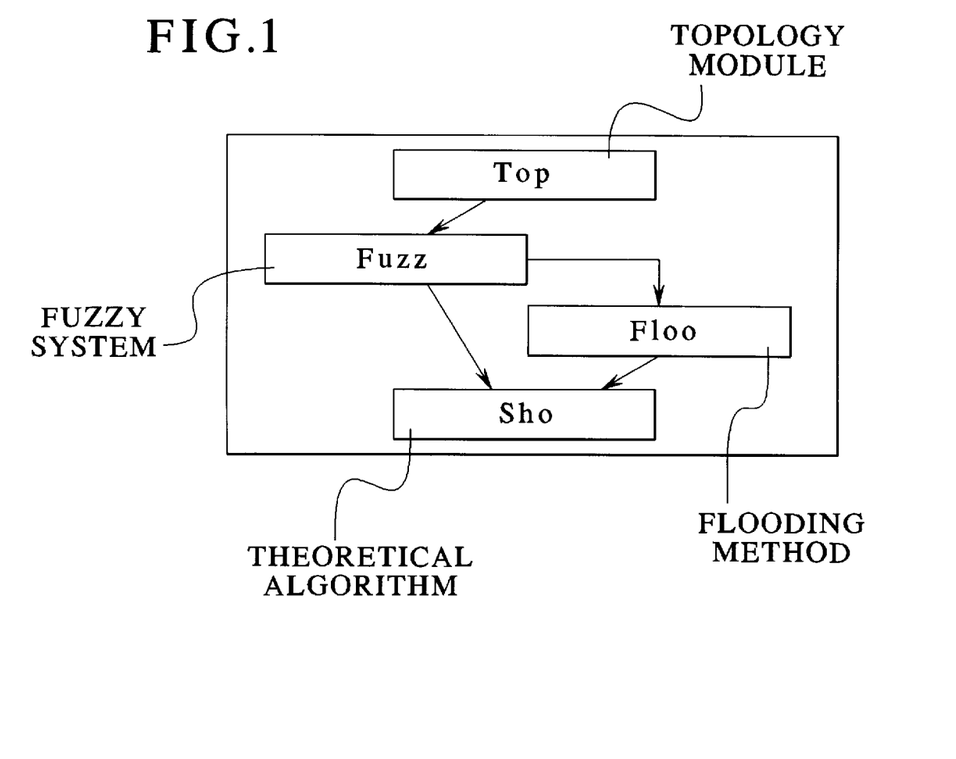
FIG. 1 shows a block circuit diagram as an example of an inventive method.

As an example, FIG. 1 shows a schematic diagram for the interaction of a plurality of components in a multi-node network. For example, a module Top of every node identifies the topology of the network. This occurs, for example, by measuring the individual connection lengths between the various nodes. For example, the delay time of each and every node can also be determined with the connections incident to it. For example, these data are subsequently communicated to all other nodes with the assistance of a flooding method Floo, referred to as flooding above. In a further module, the best nodes are identified with the assistance of a theoretical algorithm Sho. The inventive method thus begins at the point where it is important to improve the measurement, the determination and evaluation of the topology parameters. Routing metrics were also mentioned above in this context. For example, a fuzzy system Fuzz allows significantly more than one or two parameters to be easily linked to a general evaluation of the connections. This evaluation of the connection can then be employed as input quantity for a shortest-path algorithm (element Sho in FIG. 1). For example, such a routing method should be installed in each network node. For example, each node determines the input parameters of the connections incident with it for the inventive fuzzy system. It should be noted in this context that the fuzzy logic seems most suitable for the implementation of the invention but that other methods can be employed with which a plurality of quantities can be evaluated with respect to their weights. Fuzzy logic is only presented here as an exemplary solution in order to make it clear what is involved in the invention. For example, the inventive method is implemented as soon as a significant modification of one of the input parameters has derived. This modification is identified, for example, in the module Top of the schematic drawing in FIG. 1 and is subsequently forwarded to the evaluation modules Fuzz. When this evaluation of the new connection parameters leads, for example, to a change in the evaluation of at least one of the connections then, for example, the vector of the updated evaluations for the connections is distributed over the network by flooding, the routing table is updated using a shortest-path algorithm, for example the SPF algorithm.

A few input parameters for the evaluation of connections shall be recited below; however, not all of these were realized in the inventive method. For example, all information available on the level of the routing in the network are available for selection as input quantities of the inventive method. The following parameters thereby particularly seem suitable. The connection length as physical distance between two nodes. Since it is not only the distance between nodes but also the nature of the transmission medium (for example, copper cable, optical fiber cable, radial link) that influences the time that the signals require to proceed from one node to the next, it seems beneficial to select the transmission time for a packet as input for the inventive method. When, for example, one proceeds on the basis of a datagram-oriented network, then the transmission time for an entire packet can likewise be employed like the signal running time between two nodes. What is thereby meant by transmission time is the time that elapses from the beginning of the transmission onto the medium (the first bit of the packet is supplied into the network) until the last bit of the packet has reached the next node. As long as a connection exists, the transmission time is a constant quantity for the respective connection. The delay time that a packet experiences on its path from one node to the following node represents a further input quantity that can be measured as time. For example, the time is thereby measured that elapses from the point in time of transmitting a packet to a neighboring node up to the arrival of the acknowledgment that the neighboring node returns. The packet is thereby accompanied by a time stamp with the starting point in time which is sent to the transmitting node in the acknowledgment. What is thereby achieved is that only the clock of the transmitting node participates in the measurement. The constant part of the sending time is, for example, the transmission time. Essentially entering thereinto are the times that are consumed from protocol processing and in the queue.

Figure 6:
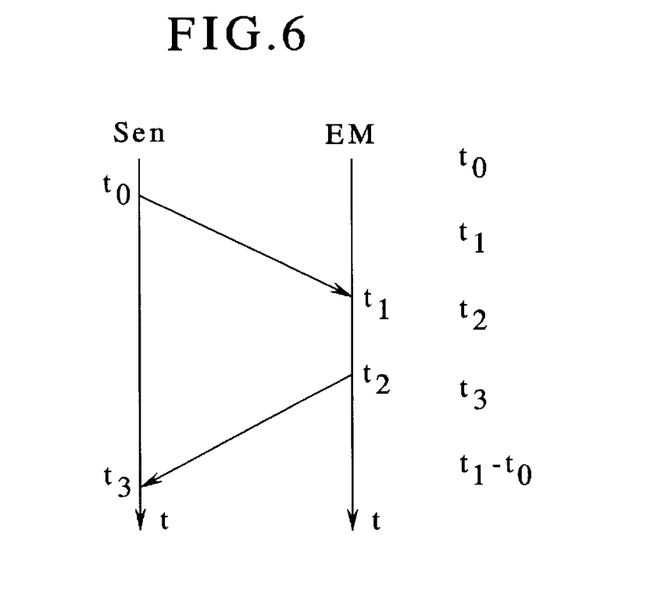
FIG. 6 recites an example for the measurement of the delay time between two communication nodes.

The load situation, for example, thereby also indirectly enters into the evaluations of the connection, as shown in FIG. 6. The difference between the delay time and the transmission time is shown therein. In FIG. 6, time $t_0$ represents the point in time at which the sender Sen sends a packet. Time $t_i$ references the point in time at which a sent packet is entered into the input queue at the receiver Em. Time $t_2$ references the point in time at which the acknowledgment is returned. $t_3$ denotes that the receiver receives the acknowledgment and can implement a comparison of the time stamp with the internal clock. The transmission time in FIG. 6 is thus calculated as $t_1-t_0$. The sender Sen and the receiver Em, for example, are thus two nodes within a multi-node communication network. Since the delay time is one of the most important parameters, the change of the delay time is also measured and is selected as input into the inventive evaluation system. The underlying idea is thereby that, given a momentarily increasing delay time on a connection, one must count on an increased delay time with the next seconds and this connection is therefore to be evaluated less high. Since the load on a computer network fluctuates, for example, with the time of day, it seems meaningful to likewise have this enter into the evaluation of a connection. When, however, short intervals are selected for measuring the measured parameters, then the fluctuations dependent on the time of day are also covered and the acquisition of the time of day parameter can be forgone. In view of future technologies such as, for example, ATM networks and applications such as multimedia and broadband services, the type of traffic (data, voice, video, . . . ) can also enter into the routing decision. This, however, means that a separate routing table is to be calculated for each type of traffic, denoting a higher memory and calculating outlay. Further, the capacity of the line can also be taken into consideration because, given a high and increasing delay time, it must be anticipated that the band width of the connection is already fully exploited. The message length, for example the plurality of packets that belong to a message, can likewise be evaluated when it is known at the beginning of a transmission. For example, this could be employed for predictions about the load situation to be anticipated. The hop plurality, previously also referred to as plurality of relay stations on a connecting path, could likewise be involved in the routing decision; however, this is only meaningful when distributed routing does not occur. Further, the age of the routing information is available as an input for the evaluation system. When, for example, the costs for the use of a connection are co-introduced into the evaluation of the connection, then the traffic can be more likely routed via more cost-beneficial connections than via expensive connection. It must thereby be taken into consideration, however, that the cheap connections could be overloaded. The dependability of the connection produces a further parameter. For example, the failsafe dependability or, respectively, the trust in the availability of a connection is thereby calculated as probability that the connection will not go down. The failsafe dependability of the neighboring node in a communication network can likewise be made known to the respective communication network. For example, neighboring nodes that are known to be more stable than others can thereby be selected in routing decisions. A further parameter can be represented by the packet loss probability. This parameter describes the probability that a packet will be lost due to overload situations.

In the inventive method, these recited parameters are advantageously combined in three evaluation categories. For example, they serve the inventive method as input variables for a two-stage fuzzy system that determines a weighted connection length. The following three groups are advantageously formed:

1. "Capacity", "costs" and "transmission time" are combined, for example, to form the group of performance criteria.
2. "Delay time" and the "change in the delay time" are combined, for example, as criteria of the time behavior of the connection.
3. The three quantities "dependability of the connection", "failsafe dependability of the neighboring node" and the "packet loss probability" are combined, for example, to form the group of dependability criteria. The inventive method is thereby designed such that no specifically existing computer network must form the basis of its functioning.

Figure 2:
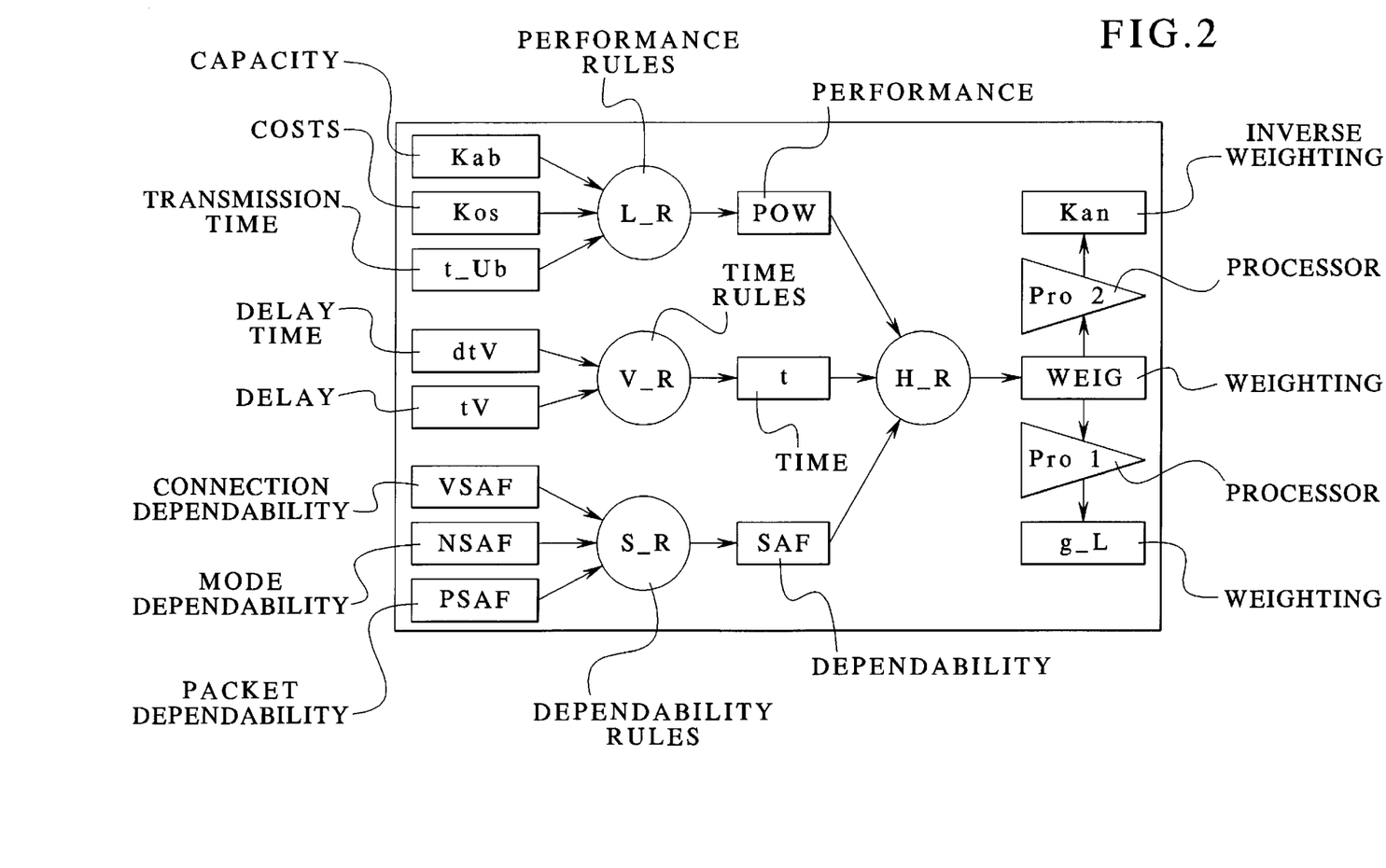
FIG. 2 shows a schematic illustration of a fuzzy evaluation system.

FIG. 2 recites an example of an inventive evaluation system of communication connections. It is schematically shown here. Rectangular boxes thereby denote linguistic variables, circles denote the rule base and triangles denote what are referred to as processor units that can implement calculating tasks. The inventive method is advantageously conceived as a two-stage system. In the first stage, for example, the input quantities are classified into the three aforementioned groups. Capacity is referenced Kap, costs are referenced Kos and the transmission time is referenced t_Ub. The change in the delay time is referenced dtV and the delay itself is referenced tV. In the dependability criteria, the connection dependability is referenced VSAF, the node dependability is referenced as NSAF and the packet dependability is referenced as PSAF. Three rule bases are preferably subsequently produced for these three groups, these defining the corresponding intermediate variables, that is, the linguistic variables for performance of the connection, time behavior of the connection and dependability of the connection. In this two-stage method, these linguistic variables represent intermediate variables. However, it is also conceivable that these variables are directly evaluated via arithmetic methods in order to identify a weighting for the corresponding line. The individual fuzzy rule sets are thereby referenced as follows. The performance rules are referenced L_R, the time rules are referenced V_R and the dependability rules are referenced S_R. The driving intermediate variables for the performance are referenced POW, are referenced t for the time and SAF for the dependability. For example, these linguistic intermediate variables are then supplied to a second stage with the principal rules H_R with which the weighting for the respective line is calculated on the basis of fuzzy logic. For example, this weighting represents an evaluation number from the interval, 0, 1. A number close to 1, for example, thereby denotes a very good evaluation and a number close to 0, analogously thereto, denotes a very poor evaluation. This weighting can then be directly employed as input for an algorithm Sho that calculates the shortest connection on the basis of the weighting WEIG.

For example, this weighting is made available via the processor PRO1 as g_L at an output of the evaluation system. The edge weighting for the respective connection in the form of the inverse weighting is made available as Kan by the processor PRO2 at a further output. The two-stage version of the inventive method thereby has the following advantages:

1. The intermediate variables, for example, can be directly supplied as input quantities to a routing algorithm functioning on the basis of fuzzy rules.
2. As a result thereof, the design of the rule base takes on a more surveyable form. It can be easily imagined that a rule base for eight input variables can become extremely unsurveyable. The design of the rule base can thereby be systematically fashioned due to the grouping of the input variables.

Figure 3:
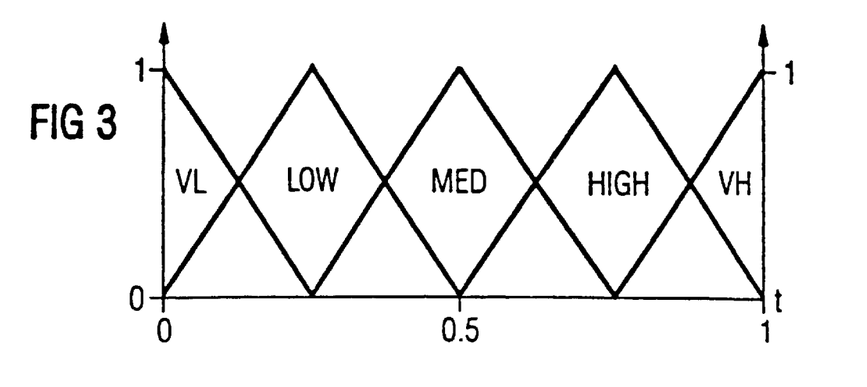
FIG. 3 recites an example of the affiliation functions of the linguistic variables of capacity.
Figure 4:
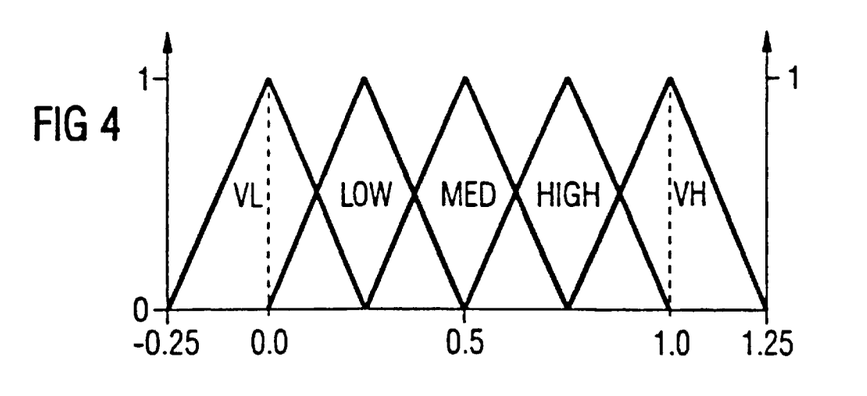
FIG. 4 recites an example of the affiliation functions for the linguistic variable of performance.
Figure 5:
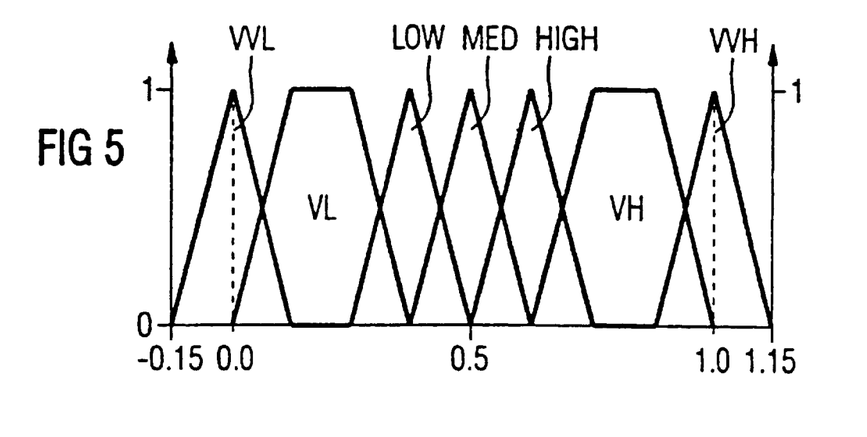
FIG. 5 recites an example of the linguistic variable of weighting.

FIGS. 3–5 recite examples of the individual linguistic variables. For example, the interval, 0, 1, has formed the basis of all variables as universe of discourse. For example, the measured values are normed to this interval before input into the fuzzy system. Only the variable "change of the delay time" represents an exception.

FIG. 3 recites an example of the affiliation function of the linguistic variables of capacity. Five fuzzy sets, "VL" (very low), "LOW", "MED" (medium), "HIGH", and "VH" (very high) with, for example, delta affiliation functions given LOW, MED and HIGH or, respectively, half delta functions given VL and VH are preferably [. . . ] for the evaluation of the capacity. By way of example, FIG. 3 shows the graphic presentation of the variables "capacity". Preferably, the variable "cost of the connection" is fashioned just like the variable "capacity", as is the variable "transmission time of the connection". The interval, −1; 1, preferably forms the basis for the "variable change of the delay time" as universe of discourse. The operational sine of the change of the delay time can then be advantageously also taken into account in the evaluation. The fuzzy sets therefor are correspondingly named "NM" negative-medium, "N" negative, "ZERO", "P" positive and "PM" positive-medium. The following, further variables taken into account are preferably constructed just like the linguistic variable of capacity: Delay time; Connection dependability; Node dependability; and Packet dependability.

The affiliation functions for the linguistic variables presented here merely represent examples. A person skilled in the art who wishes to replicate the invention can also provide other affiliation functions in detail for technical reasons that are not triangular but comprise some other curve shape. On a case-by-case basis, it can also be meaningful for technological reasons to provide a plurality of fuzzy sets for evaluation.

FIG. 4 recites an example of the affiliation function of the linguistic variable "performance". It should thereby be noted that the performance was calculated by the evaluation of the input quantities with the assistance of the performance rules. For example, the variable performance is composed of five fuzzy sets, just like the input variables. It preferably represents the price/performance ratio of the connection. So that the edge values 0 or, respectively, 1 are also reached after the defuzzification with, for example, the "max-dot-centroid" method, delta functions are selected as affiliation functions for all fuzzy sets. For example, the interval, −0.25, 1.25 forms the basis here as universe of discourse. The variable "time", for example, is constructed just like the variable "performance". It represents the time conditions on the connection under consideration. The set VL thereby represents a very poor time behavior, that is, a high delay time. Analogously, the other fuzzy sets of the variable "time" represent correspondingly more beneficial time conditions. The variable "dependability" is thereby preferably constructed just like the variable "time". It should again be pointed out that said variables are a matter of intermediate variables that have already preceded from a fuzzy-logic evaluation of the input quantities. These intermediate variables are preferably calculated in order to be able to more simply fashion the individual rule sets for the evaluation of the variables. What is here preferably exploited is that only three input quantities are to be evaluated by the principal fuzzy rule set H_R, whereas eight input quantities would have to be linked with one another by fuzzy rules given evaluation of all input quantities.

FIG. 5 shows an example of the affiliation functions of the output variable "weighting". This is preferably composed of seven fuzzy sets: "VL", "VL", ..., "VH", "VVH". These, for example, are distributed over the interval, −0.15, 1.15. Triangular or, respectively, trapezoidal affiliation functions are thereby provided, for example, for VL and VH. The edge values are thereby accorded higher significance. This has the advantage that the ultimate decision of the fuzzy evaluation system for an extremely good or, respectively, extremely poor evaluation are more pronounced, whereas a finally graduated result is achieved in the middle range.

As already mentioned above, rule bases must be provided for the evaluation of the linguistic variables. Because of the two-stage procedure, for example, these are four rule bases here. The rules deposited in the four rule bases thereby represent an important component part of the inventive method—next to the linguistic variables. They link the fuzzified input quantities to form the intermediate variables or, respectively, the ultimate connection weighting. An overview of the individual rule bases follows as an example of the corresponding evaluation of the quantities. Particularly in the field of computer networks, the formulation of the rules is a heuristic and subjective event because the rules can look completely different dependent on the aim of the designer. This results in the fact that a person skilled in the art can provide different fuzzy evaluation rules on a case-by-case basis dependent on the system to be controlled or on the networks to be evaluated. For example, he can thereby particularly link different quantities or provide more or fewer fuzzy rule sets according to his demands. The rules for the linkage of the performance parameters of the connection are contained in the rule base for the performance rules L_R in FIG. 2. The variable "performance" thereby represents the price-performance ratio of a connection. For example, a connection with low costs but high capacity and low transmission time is thereby evaluated very good, whereas a connection with the same performance data but high costs is at most considered good but not very good. The rule base L_R is preferably essentially composed of two groups of 25 rules each. In the first group, for example, the variables "capacity" in the matrix Kap and costs Kos are linked with a logical AND operation. This is shown in Table 1. The operation is symbolized by an arrow and by the term AND. 25 rules can thus be derived from this rule base by AND operation of the individual factors. It is shown in Table 1.

TABLE 1

| | Kos | | | | |
|---|---|---|---|---|---|
| Kap | VL | LOW | MED | HIGH | VH |
| VL | MED | LOW | VL | VL | VL |
| LOW | HIGH | MED | LOW | LOW | VL |
| MED | VH | HIGH | MED | LOW | VL |
| HIGH | VH | HIGH | HIGH | MED | LOW |
| VH | VH | VH | VH | HIGH | MED |

The terms that are operated in the premises with the assistance of the AND operator reside in the first column or, respectively, the second row. The terms of the output terms reside at the intersection of the row and the column of the premise terms. The variables for the transmission time and the costs are operated with one another in the second group. They are referenced Kos and t_Ub.

TABLE 2

| | Kos | | | | |
|---|---|---|---|---|---|
| t_Ub | VL | LOW | MED | HIGH | VH |
| VL | VH | VH | VH | MED | MED |
| LOW | VH | HIGH | HIGH | MED | LOW |
| MED | VH | HIGH | MED | LOW | VL |
| HIGH | HIGH | MED | LOW | LOW | VL |
| VH | MED | LOW | VL | VL | VL |

Capacity and transmission time, for example, were not compared to one another since, first, greater significance was accorded to the costs than to the two other variables and, second, it is not especially meaningful to leave the costs out of consideration in the determination of the price-performance ratio, which would be more likely to occur given an operation of capacity and transmission time. In order, for example, to obtain surveyable and replicatable rule bases, rules wherein more than two variables are operated with one another in the premise were preferably forgone.

In the rule base for the delay rules, V_R in FIG. 2, the linguistic variables for the delay time tV and for the change of the delay dtV are operated to form the intermediate variable time, referenced t in FIG. 2. As previously, it is composed of 25 rules; [. . . ] operate each term of the one input quantity with each term of the other input quantity with the assistance of the AND operator. Since this rule base, by contrast to the other three rule bases, is two-dimensional, it can be shown as a whole in Table 3:

TABLE 3

| | tv | | | | |
|---|---|---|---|---|---|
| dtV | VL | LOW | MED | HIGH | VH |
| NM | VH | VH | HIGH | HIGH | MED |
| N | VH | VH | HIGH | MED | LOW |
| ZERO | VH | HIGH | MED | LOW | VL |
| P | HIGH | MED | LOW | VL | VL |
| PM | MED | LOW | LOW | VL | VL |

The rule base for the dependability rules, referenced S_R in FIG. 2, is more extensive than the two other rule bases.

It is preferably composed of six groups of rules. The first three groups are thereby composed of simple rules having the form:

If Variable_a=Term_1, then Variable_b=Term_2 where "call dependability", referenced VSAF, "node dependability", referenced NSAF, and "packet dependability", referenced PSAF, can be respectively introduced for the variable_a in every group. Variable_b is always the "dependability". The rule surface of a linear regulator is generated by this total of 15 rules. These rule sets are shown in Tables 4a, b and c.

TABLE 4

| a) | | b) | | c) | |
|---|---|---|---|---|---|
| VSAF | SAF | NSAF | SAF | PSAF | SAF |
| VL | VL | VL | VL | VL | VL |
| LOW | VL | LOW | VL | LOW | VL |
| MED | MED | MED | MED | MED | VH |
| HIGH | HIGH | HIGH | HIGH | HIGH | HIGH |
| VH | VH | VH | VH | VH | MED |

Two of the input variables are preferably operated with one another in the remaining three rule groups. This likewise occurs with the assistance of an AND operator. However, all possibilities in the rule matrix are thereby preferably not covered; rules are formulated only at the edges, that is, in the regions in which one of the two variables under consideration assumes extreme values. The rule surface becomes steeper at the edges in this way and remains approximately linear in the middle. This situation is shown in Table 5, whereby the connection dependability is referenced VS and the node dependability is referenced KS.

TABLE 5

| | KS | | | | |
|---|---|---|---|---|---|
| VS | VL | LOW | MED | HIGH | VH |
| VL | VL | VL | VL | VL | LOW |
| LOW | VL | VL | | | LOW |
| MED | VL | | | | MED |
| HIGH | VL | | | HIGH | HIGH |
| VH | LOW | LOW | MED | HIGH | VH |

The principal rules, referenced H_R in FIG. 2, finally, represent an especially important rule base. They are especially important since the intermediate variables are operated here to form the preliminary output quantity weight WEIG. It should thereby be noted that the intermediate variables are constructed of five terms, of "VL", ..., "VH"; bu the linguistic variable weight is composed of seven terms "VL", ..., "VVH" for precision.

Like the dependability rules S_R, the principle rules H_R can also be divided into six groups of rules. The first three groups are preferably composed of rules as simple as the first three groups of the dependability rules S_R. Here, direct imaging onto the destination quantity weight, referenced WEIG in FIG. 2, is carried out from every intermediate variable such as performance, time and dependability, referenced POW, t and SAF in FIG. 2.

Since the variable "time" was accorded the greatest significance for the routing decision, the possibility of allocating weights to the rules was utilized in these three groups. For example, the rules that image the variable time onto the variable weight were weighted with 150%, whereas the other two groups of the simple rules are only weighted with 50%. It should again thereby be noted that this is only a matter of examples, so that other weightings or even no weightings at all can be provided by a person skilled in the art without negatively influencing the invention. This situation is shown in Tables 6a–6c.

TABLE 6

| a) | |
|---|---|
| POW | |
| 50% | WEIG |
| VL | VVL |
| LOW | VL |
| MED | MED |
| HIGH | VH |
| VH | VVH |
| b) | |
| t | |
| 150% | WEIG |
| VL | VVL |
| LOW | VL |
| MED | MED |
| HIGH | VH |
| VH | VVH |
| c) | |
| SAF | WEIG |
| VL | VVL |
| LOW | VL |
| MED | VL |
| HIGH | VH |
| VH | VVH |

Respectively two of the intermediate variables are operated with AND in the remaining three rule groups, as in the case of the dependability rules, whereby, for example, the rule matrices are also only occupied at the edges. First, for example, the rules in which the dependability SAF is operated with the time t, as shown in Table 7.

TABLE 7

| | t | | | | |
|---|---|---|---|---|---|
| SAF | VL | LOW | MED | HIGH | VH |
| VL | VVL | VVL | VVL | VL | VL |
| LOW | VVL | VVL | | | LOW |
| MED | VVL | | | | HIGH |
| HIGH | VL | | | VVH | VVH |
| VH | VL | LOW | HIGH | VVH | VVH |

It may be seen with reference to the rules that operate the performance POW with the t, that the variable "performance" is accorded less of a high significance compared to the variable "time". that is, a performance evaluated as poor is not viewed as seriously as a poor evaluation of the time. This situation is shown in Table 8.

TABLE 8

| | t | | | | |
|---|---|---|---|---|---|
| POW | VL | LOW | MED | HIGH | VH |
| VL | VVL | VL | VL | LOW | MED |
| LOW | VVL | LOW | | | HIGH |
| MED | VVL | | | | VVH |

TABLE 8-continued

| | | | t | | |
|---|---|---|---|---|---|
| POW | VL | LOW | MED | HIGH | VH |
| HIGH | LOW | | | HIGH | VVH |
| VH | LOW | MED | HIGH | VVH | VVH |

It may also be seen with reference to the rules that operate the variable "performance" with the variable "dependability", that a high dependability of the connection is deemed more important than good performance, for what is the use of a connection no matter how good when a great part of the packets are nonetheless lost. This situation or, respectively, rule set is shown in Table 9.

TABLE 9

| | | | SAF | | |
|---|---|---|---|---|---|
| POW | VL | LOW | MED | HIGH | VH |
| VL | VVL | VVL | LOW | MED | HIGH |
| LOW | VVL | VVL | | | HIGH |
| MED | VL | | | | VH |
| HIGH | VL | | | VVH | VVH |
| VH | VL | LOW | MED | VVH | VVH |

As a result of the construction of the six rule groups, the behavior of the fuzzy evaluation system in the center of the interval is determined by the three rule groups described first, whereas the three latter rule groups form the rule surface steeper toward the edges. This means that the system reacts more sensitively there to changes of the intermediate variables.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A method for evaluating at least two multi-part communication connections in a multi-node network, comprising the steps of:

determining at least two evaluation categories for evaluating a communication connection;

acquiring at least one measured value that describes a connection with respect to an evaluation category for each determined evaluation category for a respective communication connection, said evaluation category of said at least two evaluation categories being at least one of performance of the respective communication connection, time behavior of the respective communication connection, and dependability of the respective communication connection;

determining an evaluation criterion for the respective communication connection, an associated measured value thereof being evaluated in the form of satisfaction degrees with respect to satisfaction of the respective evaluation category and all satisfaction degrees being operated with one another such that a communication connection that has higher satisfaction degrees with respect to the at least two evaluation categories receives an optimum evaluation criterion; and measured values being processed with fuzzy logic and being treated as linguistic variables whose satisfaction degrees are identified using affiliation functions, and at least one fuzzy rule set being employed for each of the evaluation categories of said at least two evaluation categories.

2. The method according to claim 1, wherein the evaluation criterion for the respective communication connection is formed by a two-time application of fuzzy logic, wherein the satisfaction degrees for individual evaluation categories of said at least two evaluation categories are processed with fuzzy logic, the satisfaction degrees being handled as linguistic variables that are evaluated using at least one principal fuzzy rule set.

3. The method according to claim 2, wherein at least respective rule sets that operate the following variables with one another are employed as a principal fuzzy rule set: time behavior of the respective communication connection with its dependability; time behavior of the respective communication connection with its performance; and performance of the respective communication connection with its dependability.

4. The method according to claim 1, wherein at least respective rule sets that operate the following variables with one another are employed: costs of the respective communication connection with its transmission capacity; transmission time with the costs of the respective communication connection; delay time between two nodes with the time change of the delay time between two nodes; and connection dependability of the respective communication connection with its packet dependability.

5. The method according to claim 1, wherein potential communication connections are evaluated, and wherein a potential communication connection which receives the optimum evaluation criterion, is selected for set up of a real connection.

6. A method for evaluating at least two multi-part communication connections in a multi-node network, comprising the steps of:

determining at least two evaluation categories for evaluating a communication connection, an evaluation category of said at least two evaluation categories being at least one of performance of the communication connection, time behavior of the respective communication connection, and dependability of the communication connection;

acquiring at least one measured value that respectively describes a connection with respect to an evaluation category for each determined evaluation category for a respective communication connection;

processing said at least one measured value with fuzzy logic, measured values being treated as linguistic variables whose satisfaction degrees are identified using affiliation functions, and at least one fuzzy rule set being employed for each of the evaluation categories of said at least two evaluation categories; and determining an evaluation criterion for the respective communication connection, an associated measured value thereof being evaluated in the form of satisfaction degrees with respect to satisfaction of the evaluation category, and all satisfaction degrees being operated with one another such that a communication connection that has higher satisfaction degrees with respect to the at least two evaluation categories receives an optimum evaluation criterion.

7. The method according to claim 6, wherein measured values to be acquired are at least respectively determined for: Performance in terms of transmission capacity, transmission costs, transmission time; Time Behavior in terms of delay time between two nodes, time change of the delay time between two nodes; and Dependability in terms of connection dependability, node dependability, packet dependability.

8. The method according to claim 6, wherein the evaluation criterion for the respective communication connection is formed by a two-time application of fuzzy logic, wherein the satisfaction degrees for individual evaluation categories of said at least two evaluation categories are processed with fuzzy logic, the satisfaction degrees being handled as linguistic variables that are evaluated using at least one principal fuzzy rule set.

9. The method according to claim 8, wherein at least respective rule sets that operate the following variables with one another are employed as a principal fuzzy rule set: time behavior of the respective communication connection with its dependability; time behavior of the respective communication connection with its performance; and performance of the respective communication connection with its dependability.

10. The method according to claim 6, wherein at least respective rule sets that operate the following variables with one another are employed: costs of the respective communication connection with its transmission capacity; transmission time with the costs of the respective communication connection; delay time between two nodes with the time change of the delay time between two nodes; and connection dependability of the respective communication connection with its packet dependability.

11. The method according to claim 6, wherein potential communication connections are evaluated, and wherein a potential communication connection which receives the optimum evaluation criterion, is selected for set up of a real connection.

12. An apparatus for evaluating at least two multi-part communication connections in a multi-node network, comprising:

at least two evaluation categories for evaluating a communication connection;

at least one measured value that describes a connection with respect to an evaluation category for each determined evaluation category for a communication connection, an evaluation category of said at least two evaluation categories being at least one of performance of the respective communication connection, time behavior of the respective communication connection, and dependability of the respective communication connection;

an evaluator for evaluating an associated measured value in the form of satisfaction degrees with respect to satisfaction of the evaluation category, and all satisfaction degrees being operated with one another such that a communication connection that has higher satisfaction degrees with respect to the at least two evaluation categories receives an optimum evaluation criterion;

processor for processing measured values with fuzzy logic, the measured values being treated as linguistic variables whose satisfaction degrees are identified using affiliation functions, and at least one fuzzy rule set being employed for each of the evaluation categories of said at least two evaluation categories.

13. The apparatus according to claim 12, wherein the evaluation criterion for the respective communication connection is formed by a two-time application of fuzzy logic, wherein the satisfaction degrees for individual evaluation categories of said at least two evaluation categories are processed with fuzzy logic, the satisfaction degrees being handled as linguistic variables that are evaluated using at least one principal fuzzy rule set.

14. The apparatus according to claim 13, wherein at least respective rule sets that operate the following variables with one another are employed as a principal fuzzy rule set: time behavior of the respective communication connection with its dependability; time behavior of the respective communication connection with its performance; and performance of the respective communication connection with its dependability.

15. The apparatus according to claim 12, wherein at least respective rule sets that operate the following variables with one another are employed: costs of the respective communication connection with its transmission capacity; transmission time with the costs of the respective communication connection; delay time between two nodes with the time change of the delay time between two nodes; and connection dependability of the respective communication connection with its packet dependability.

* * * * *